March 29, 1938.  J. H. KOHLER  2,112,461
PACKING RING
Filed Oct. 16, 1935
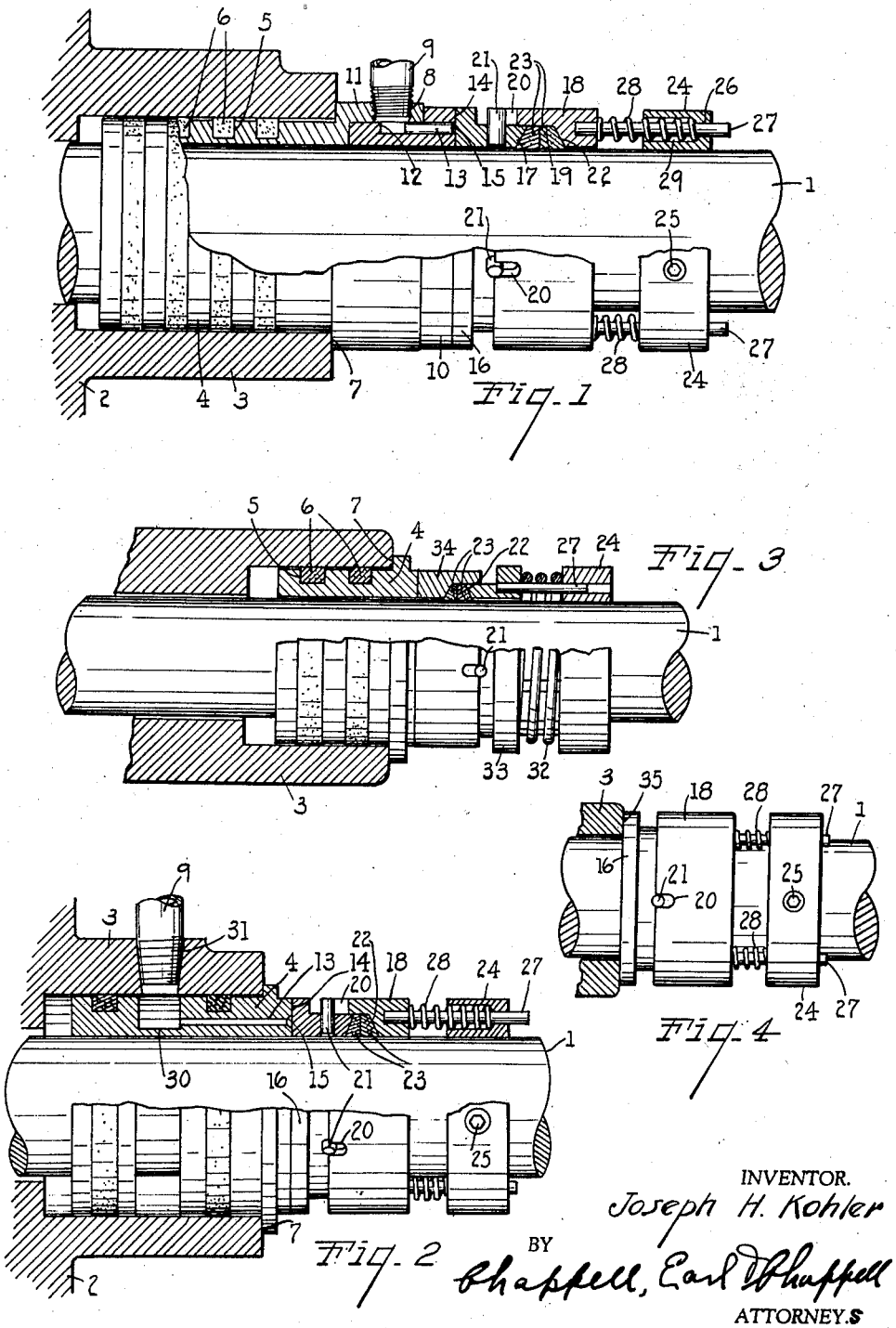
INVENTOR.
Joseph H. Kohler
BY
Chappell, Earl Chappell
ATTORNEYS Patented Mar. 29, 1938

2,112,461

UNITED STATES PATENT OFFICE 2,112,461

PACKING RING

Joseph H. Kohler, Calumet, Ill.

Application October 16, 1935, Serial No. 45,171

3 Claims. (Cl. 286—8)

This application is a continuation in part of my application Serial No. 7,939, filed February 25, 1935.

The main objects of this invention are:

First, to provide an improved packing assembly for relatively rotatable parts such as a casing or housing and rotary shaft.

Second, to provide a packing of the foregoing character wherein a certain amount of misalinement of the shaft is absorbed so that the bearing seal is not affected thereby.

Third, to provide a packing which is readily constructed due to improvements therein designed to facilitate assembly.

Objects relating to details and economies of my invention will appear from the description to follow. The invention is defined and pointed out in the claims.

Preferred embodiments of my invention are illustrated in the accompanying drawing, in which:

Fig. 1 is a fragmentary sectional view partly in side elevation and partly in longitudinal section, of a packing embodying features of my invention.

Figs. 2, 3, and 4 are similar views of modifications.

Referring to Fig. 1, reference numeral 1 indicates a rotatable shaft mounted for rotation in a casing or housing 2 having a stuffing box 3 through which the shaft extends. Disposed within the stuffing box is an annular element or cylinder block 4 having grooves 5 therein, which grooves are adapted to receive rings 6 of packing material to bear against the wall of the stuffing box. Block 4 is held against rotation in the stuffing box, the shoulder 7 thereof abutting against the end of the stuffing box and the block is provided with a hole 8 therein tapped to receive a pipe 9 adapted to be connected to a grease cup or other source of lubricant. The annular element 4 is a two-part construction comprising the outer block just described and an inner member 10 which is annular in shape and is pressed into telescoping relation within a protruding sleeve 11 of block 4 so that member 10 is rigidly held with respect to the element and forms a part thereof. Inner annular member 10 is machined or otherwise formed with an annular groove 12 surrounding the same to provide an annular passage within the packing and has longitudinal oil passages 13 communicating between said groove and the outer sealing face 14 of the member. The sealing face 14 is provided with a circumferential oil distributing groove 15. The annular element 4 may be formed of any suitable material such as fiber or metal, the latter being quite satisfactory.

On the shaft 1 is a sealing ring 16 bearing against the sealing face 14 of member 10 and having an inclined outer end packing seat or face 17. The sleeve 18 has an undercut portion 19 telescoped over the sealing ring 16, said undercut portion being provided with open slots 20 receiving radial pins 21 provided on sealing ring 16. A packing or gasket groove 22 is provided between the ring and sleeve, said groove containing packing rings 23 coacting with the shaft 1. The sides of the groove 22 are sloped so that movement of the sleeve toward the ring acts to contract the packing into sealing engagement with the shaft.

On the shaft 1, I mount a collar 24, the collar being secured in adjusted position to the shaft by means of a set screw 25. The collar and sleeve are provided with spaced longitudinal bores 26 in which are disposed pins 27 connecting the sleeve for rotation with the collar. On the pins 27, I dispose coiled compression springs 28 between the collar and sleeve, the springs acting to urge the sleeve toward the sealing ring and the latter against the sealing face 14 of member 10 regardless of variations in the axial position of the shaft relative to the stuffing box. Collar 24 is provided with sockets 29 receiving the ends of springs 28.

In operation, with the parts arranged in the foregoing manner, the cylinder block or packing element 4 remains stationary with the casing 2 and stuffing box 3, while the sealing ring 16, sleeve 18 and collar 24 rotate with the shaft 1. Torsional strain on the packing rings 23 is relieved by the pin and slot connecting means between the ring and sleeve. Axial misalinement between the shaft 1 and the bore of the annular element 4 is absorbed by the parts so that the various seals are not disturbed, especially the bearing seal between the sealing ring 16 and sealing face 14 of member 10 forming a part of element 4. The springs are not submerged in the fluid in casing 2 and it is to be noted that there is a substantial clearance between the shaft and the element or block 4, the sealing ring 16 and the sleeve 18, the object being to permit adaptation to shafts that are out of alinement or to permit the packing to accommodate itself to particular conditions. The packing is most effective in operation and is very simple and economical in its parts.

I have found it advantageous to form annular element or block 4 from two parts pressed together, inasmuch as lubricant groove 12 is more readily formed by such a procedure. A two-part block 4 of the nature described permits the invariable location of the tapped hole 8 with respect to groove 12, and this constitutes a decided advantage inasmuch as it has been found difficult to accurately locate the lubricant groove so that it will cooperate with a lubricant feed pipe tapped directly into the stuffing box. In the construction just described, this difficulty is eliminated inasmuch as element 4 and member 10 may be accurately and uniformly machined to standard dimensions for cooperation with one another, regardless of the nature of the stuffing box. Also, the member 4 may be a casting of one metal and the member 10 may be cast or formed of another metal as may be desirable for economy to wear or to meet other conditions.

In Fig. 2, a modification is illustrated which is similar to Fig. 1, with the exception that the peripheral oil channel 30 is formed in a one-piece cylinder block or element 4, the lubricant passages 13 communicating between the groove 12 and circumferential lubricant grooves 15 in the outer sealing face 14 thereof. A hole 31 is drilled and threaded in the stuffing box 3 to receive a lubricant supply pipe 9. In other respects, the modification of Fig. 2 is identical to that of Fig. 1.

In Fig. 3 a further modification is shown, in which a single coiled compression spring 32 surrounds longitudinal pins 27 between sleeve 33 and collar 24. In this modification, I have reversed the ring and sleeve assembly of Figs. 1 and 2, the sleeve 34 becoming the end bearing sealing ring. Further, I have eliminated the means for supplying the bearing seal with lubricant. Otherwise, the packing of Fig. 3 is substantially similar to that of Figs. 1 and 2. The arrangement of Fig. 3 has the disadvantage that in case of failure of the spring 32 there will result a failure in the bearing seal between the sleeve 34 and stationary element 4.

Referring to Fig. 4, I show a modification in which the function of the stationary block 4 of the preceding modification is performed by the stuffing box 3 which has a bore for the passage of the shaft 1 and a right end face 35 for coaction with the rotating ring 16 to provide a bearing seal. Otherwise, the arrangement is substantially like that described above in connection with Figs. 1 and 2.

In all of the embodiments illustrated, it will be perceived that I have supplied a packing structure which is efficiently operative regardless of variations in the position of the shaft to which it is applied. Each of the modifications is characterized by the fact that torsional stress is removed from the packing members 23. The modification shown in Fig. 1 is recommended by the fact that it can be supplied to any stuffing box without regard to the location of a lubricating fitting borne by the packing structure itself. The novel construction of element 4 furnishes this advantage.

I have illustrated and described my improvements in embodiments which I have found very practical. I have not attempted to illustrate or describe other embodiments or adaptations as it is believed this disclosure will enable those skilled in the art to embody or adapt my improvements as may be desired.

Having thus described my invention, what I claim as new and desire to secure by Letters Patent is:

1. The combination with a rotatable shaft, a casing having a stuffing box through which said shaft extends, an annular element held against rotation in said stuffing box and comprising an outer block having peripheral grooves to receive sealing rings and a radial lubricant passage, and an inner member having a peripheral groove and longitudinal passages communicating therewith, said inner member being fixedly sleeved in said block with said groove in registration with said radial passage, a sealing ring bearing against said annular element, a sleeve disposed on said shaft in telescoping relation to said ring, a slot and pin connection between said sleeve and ring, a collar fixed to said shaft, spaced longitudinal bores in said collar and sleeve, pins in said bores providing a driving connection between said collar and sleeve, and compression springs disposed around said pins, there being packing disposed around said shaft between said sleeve and ring.

2. The combination with a rotatable shaft, a casing having a stuffing box through which said shaft extends, an annular element held against rotation in said stuffing box and comprising an outer block having peripheral grooves to receive sealing rings and a lubricant passage, and an inner member having a peripheral groove, said inner member being fixedly telescoped with said block with said groove in registration with said passage, a sealing ring bearing against said annular element, a sleeve disposed on said shaft in telescoping relation to said ring, a slot and pin connection between said sleeve and ring, a collar fixed to said shaft, spaced longitudinal bores in said collar and sleeve, pins in said bores providing a driving connection between said collar and sleeve, and compression springs disposed around said pins, there being packing disposed around said shaft between said sleeve and ring.

3. The combination with a rotatable shaft, a casing having a stuffing box through which said shaft extends, an annular element held against rotation in said stuffing box and comprising an outer block having peripheral grooves to receive sealing rings and a radial lubricant passage, and an inner member having a peripheral groove and longitudinal passages communicating therewith, said inner member being fixedly sleeved in said block with said groove in registration with said radial passage, and a sealing ring bearing against said annular element.

JOSEPH H. KOHLER.